Figure 3:
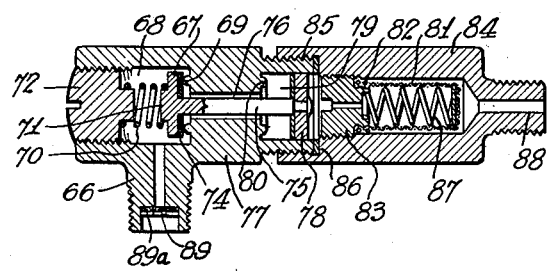

Oct. 22, 1935.  J. BIJUR  2,017,848
LUBRICATION INSTALLATION AND THE ELEMENTS THEREOF
Original Filed Oct. 25, 1922   3 Sheets-Sheet 1
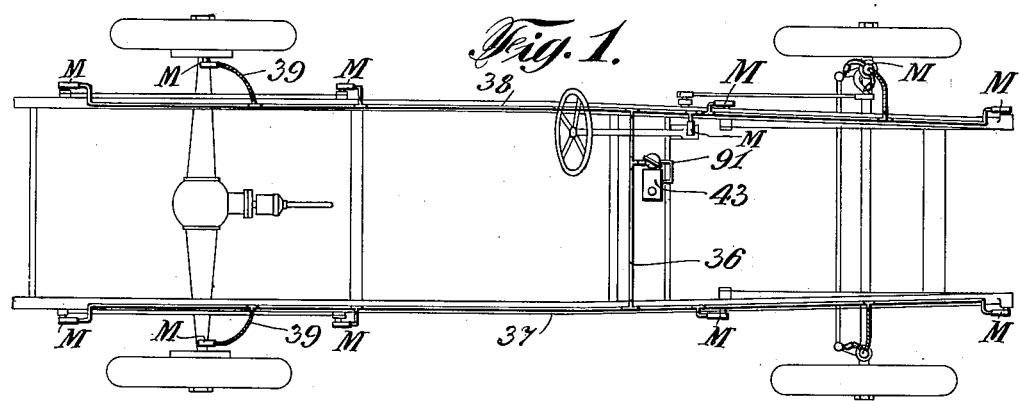
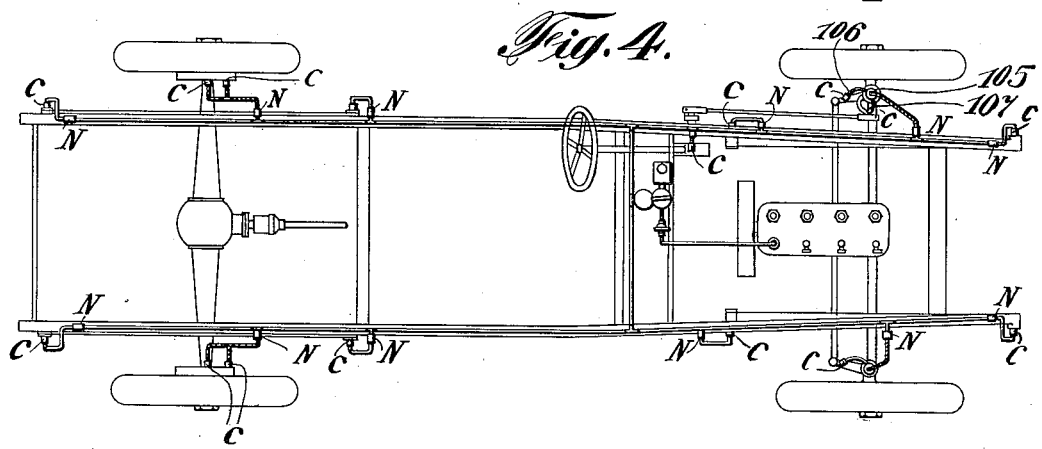
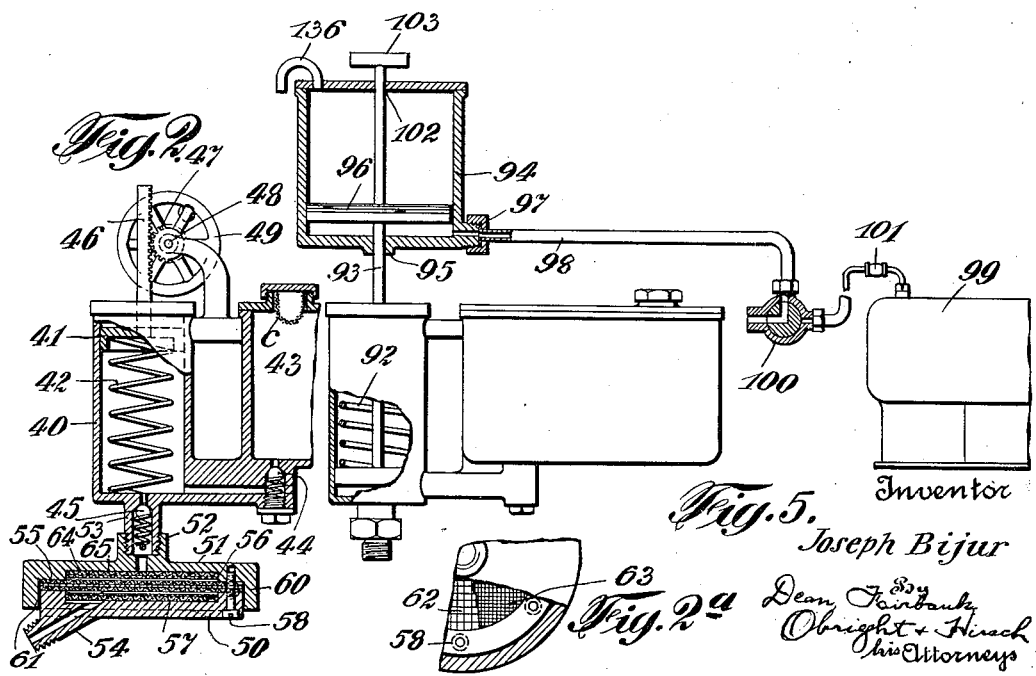

Oct. 22, 1935.    J. BIJUR    2,017,848
LUBRICATION INSTALLATION AND THE ELEMENTS THEREOF
Original Filed Oct. 25, 1922    3 Sheets-Sheet 2

INVENTOR
Joseph Bijur.
BY
Dean, Fairbank, Obrieght & Hirsch.
his ATTORNEYS.

Oct. 22, 1935.        J. BIJUR        2,017,848
LUBRICATION INSTALLATION AND THE ELEMENTS THEREOF
Original Filed Oct. 25, 1922    3 Sheets-Sheet 3
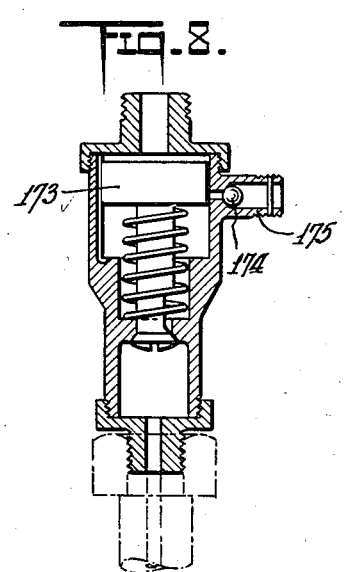
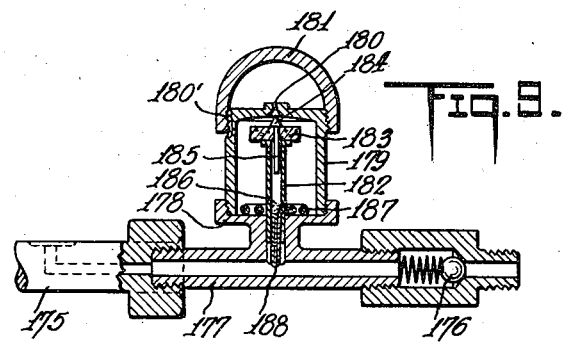
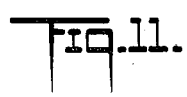
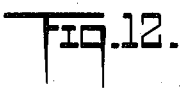
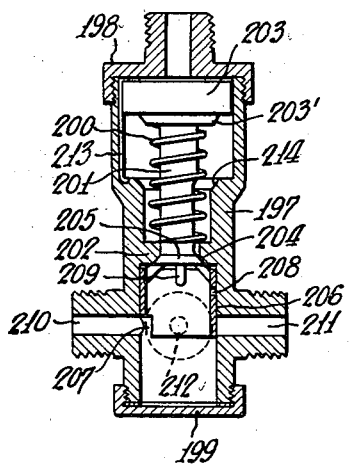
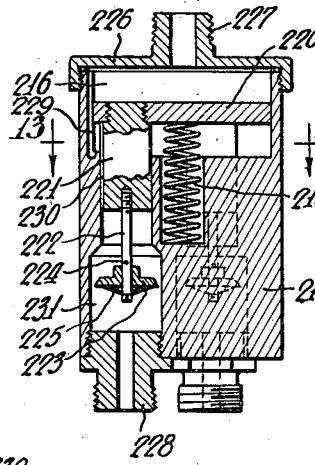
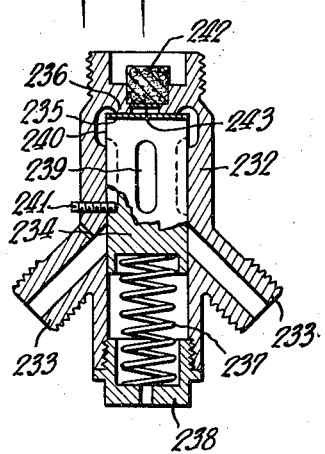
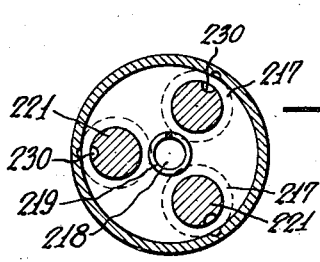
INVENTOR
Joseph Bijur
BY
ATTORNEYS Patented Oct. 22, 1935

2,017,848

UNITED STATES PATENT OFFICE 2,017,848

LUBRICATION INSTALLATION AND THE ELEMENTS THEREOF

Joseph Bijur, New York, N. Y., assignor, by mesne assignments, to Auto Research Corporation, a corporation of Delaware Application October 25, 1922, Serial No. 596,856
Renewed January 29, 1932

48 Claims. (Cl. 184—7)

My present invention relates to remote control lubrication and is concerned primarily with systems and installations, and the constituent elements thereof, for lubricating one or more bearings on a machine or group of machines, from a readily accessible point or points of control. The invention has its preferred application to the lubrication of all ro most of the bearings on the chassis of a vehicle, such as an automobile or motor truck.

An object is to provide a reliable lubricating installation, more particularly for motor vehicles, the use of which shall not require the exercise of any selective discretion, but in which following the simplest of manipulations, predetermined charges of lubricant may be distributed at a plurality of bearings, whether tight or loose, without overflow.

Another object is to provide apparatus of the above type, the constituent parts of which shall be simple and durable in construction, easy to install, and unlikely to become out of order even after prolonged use.

The invention is primarily concerned with pressure lubricating systems, that is, with systems in which desired charges of oil are forced under pressure into the bearings.

It may be noted that where in a system of this type, oil is forced from a pump past a plurality of relief valves in parallel to corresponding bearings, unless the resistance to pressure of each line from the pump to a bearing, including the resistances of said bearing and of the relief valve in the line, is substantially uniform, lubricant is likely to be forced, first through the line of least resistance, so that pressure is relieved therethrough, and disproportionate charges of oil from the pump cylinder may be supplied to different bearings, some overflowing and others receiving too little oil.

By my invention, I have provided an arrangement for overcoming this objection. In one embodiment of the invention, a lubricant measuring valve is associated preferably with each bearing, to assure a supply thereto, upon operation, of the predetermined measured quantity of lubricant. The measuring elements may be in the form of automatic pressure-operated measuring valves, disposed adjacent the bearings.

To assure the regular functioning of the lubricant measuring elements, it is preferred to maintain the lubricant lines from the pump to the bearings filled with oil at all times. This result, I accomplish by the use of pressure-operated relief valves, which may be associated in a unitary structure, with the measuring valves, particularly, where the latter are adjacent or at the bearings. To assure effective seating of the relief valves, I prefer to employ means for eliminating solid particles of dirt and chips from the lubricant, before the latter reaches the relief valves.

If the dirt intercepting means impose large resistance to flow, they may interfere with the rush of oil desirable for best operation of the measuring valves. On the other hand, wire mesh screens while not absorbing much of the pressure, may allow small solid particles to pass on to the valves and impair the operation of the latter. To secure an effective operation without interfering with rapid operation of the valves I prefer to interpose a closed membrane cup, the end of which is displaced preferably by collapse under the rush of oil, thereby advancing the lubricant therebeyond, the cup being slowly restored under the action of a spring as the oil seeps therethrough after relief of pressure. These cups may be provided at the inlets to the various valves. If desired, they may themselves be protected from clogging by a filter of similar characteristics at the outlet of the pump. It is preferred also to protect the outlets of the measuring or relief valves by appropriate screens.

Another feature is the provision of a pump having an effective volume somewhat in excess of the combined effective volumes of the various measuring valves on the line, the excess charge of said pump being returned past a relief valve to the source of lubricant, thereby to assure, on the one hand, the complete operation of the relief valves regardless of wear, and on the other hand, the automatic return of said relief valves, after operation by relief of the sustained pressure on the pipe line.

Figure 6:
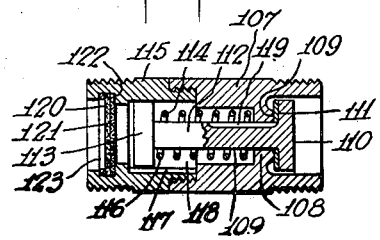
Figure 7:
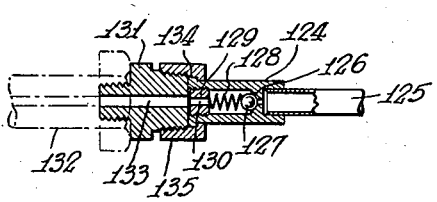

In the accompanying drawings in which are shown some of various possible embodiments of the several features of the invention, Fig. 1 is a diagrammatic view of one form of chassis installation, Fig. 2 is a detail view, partly broken away, of the pump employed in Fig. 1, Fig. 2a is a fragmentary plan of the filter shown in Fig. 2, Fig. 3 is a longitudinal view in cross-section on an enlarged scale of a preferred form of measuring valve, Fig. 4 is a diagrammatic view similar to Fig. 1 of an alternative form of chassis installation, Fig. 5 is a diagrammatic view of the pump equipment shown in the embodiment of Fig. 4, Fig. 6 is a view similar to Fig. 3 of an alternative form of measuring valve, Fig. 7 is a view in longitudinal section of a form of relief valve, Fig. 8 is a view in longitudinal cross-section of one form of multiple measuring valve, Figs. 9 and 10 are alternative forms of reservoir fittings, Figs. 11, 12 and 14 are alternative forms of multiple measuring valves, Fig. 13 is a transverse sectional view taken along the line 13—13 of Fig. 12.

In Fig. 1 is shown a diagrammatic view of a chassis lubricated by the hand-operated pump shown in Fig. 2. The outlet of the pump is connected to a single pipe or header 36 extending across the chassis which, in turn, feeds pipes or mains 37 and 38 on either side of the chassis and running lengthwise thereof. Measuring valve appliances M are supplied from these pipes, to lubricate bearings on the frame and flexible branches 39 lead to similar measuring valve appliances for the bearings on the axles, the piping being preferably solid metal tubing constructed and arranged as shown in detail in Patent 1,632,772 granted to me on the 14th day of June 1927.

The pump illustratively shown in Fig. 2 comprises a cylinder 40 within which is a piston 41 maintained normally in pump-charging position by the expansion of a coil spring 42. The cylinder is connected to or cast integral with a pump reservoir 43 communicating at the bottom through a check valve 44 of any appropriate construction, and the usual relief valve 45 is provided near the outlet of the pump. The piston has a rack 46 extending from the top thereof meshing with a pinion 47 formed on the axle 48, of a hand wheel 49 by rotation of which the piston is caused to descend against the resistance of the spring 42 for discharging the pump.

If oil carrying solid particles were supplied to the bearings, the relief valves to be hereinafter described, by which the lines are maintained full, might be rendered inoperative by lodging a particle of dirt which may prevent complete seating of the valve. I remedy this difficulty by the provision of appropriate filtering means adjacent the pump to intercept solid particles. Since, as heretofore noted, it is desired in the present system to cause the oil to enter the bearings under pressure, it is preferred to employ a filter of relatively low resistance, so that with the application of moderate pressures at the pump, there will be ample pressure at the bearing after the drop of pressure potential in the filter and in the length of the line.

In the embodiment shown in Fig. 2, the filter comprises a head formed of a base casting 50 and a cover casting 51 telescoped thereover, the latter having a central boss 52 threaded to the outlet nipple 53 of the pump, and the former, a boss 54 near the periphery thereof for application of the conduit leading to the bearings. The filtering element comprises preferably a disk 55 of filter paper, reinforced by disks 56 and 57 of canvas, preferably cotton duck, the latter serving to protect the paper against tearing under strain. The cotton duck layers with the interposed filter paper are clamped in place between the base and the cover casting of the head by pressure exerted through the clamping screws 58 by which these elements are held together. The space between the base element and the flange 60 of the telescoping cover is preferably completely sealed with solder 61, so that pressure applied at the head will force the lubricant through the duck and filter paper to the outlet 53 to the line without leakage between the casing elements of the filter head.

In the use of the construction thus far described, the application of pressure may result in bowing the filtering disk with its cotton duck backing, so that a portion thereof may snugly contact the filter base, thereby preventing passage of lubricant at the area of contact. To overcome this, I provide an open mesh limiting stop which will not impede the passage of lubricant when contacted by the bowed filter element. In the preferred embodiment, this stop comprises two layers of metal wire mesh. I have obtained good results by employing a screen 62 of about three meshes to the inch, contacting the surface of the filter head base and a second screen 63 of about 8 meshes to the inch superposed thereon and facing the filter element. If the larger wire mesh screen alone were employed, it would be possible under application of pump pressure to cause the duck reinforce to become firmly lodged within the individual meshes, while the use of the smaller wire mesh screen alone may not afford sufficient space for escape of the lubricant when the filter unit is bowed thereagainst. By the use of the two wire mesh elements, these objections are overcome. Preferably the cover element 51 is provided with a wire mesh limiting screen 64—65 similar to that described.

If dirty oil were admitted to reservoir 43, the filter might rapidly become clogged. I, therefore, provide a strainer cup C at the filling opening, to intercept coarser particles of dirt. The detailed construction of this cup is not shown as it is preferably the same as that shown in my copending application Serial No. 580,668, filed August 9, 1922.

A preferred form of measuring valve is that shown in Fig. 3, the location of which on the chassis of Fig. 1, is indicated by the letter M. This valve comprises a pipe fitting having a threaded nipple 66 to be screwed into the bearing in lieu of an oil cup. A relief valve 67 is disposed in a chamber 68 in the fitting, and is urged against valve seat 69 by a coil spring 70 encircling a button or lugs 71 of the valve and reacting at its opposite end against a closure plug 72 threaded into the end of the fitting.

To assure effective seating of the relief valve, the valve seat is preferably highly burnished and the seating surface of the valve, as in my patent referred to, is provided with a seating portion of a material yielding to compensate for possible irregularities in the seat, smooth, to seat completely under light pressure, substantially impervious and chemically inert to oil, and non-sticking. In one type of construction, the seating portion comprises an oil-proof yielding backing with a smooth oil-proof, pliable and non-sticking facing to engage the valve seat. The backing may be smooth cork, or oil-proof rubber compound, one commercial form of which is known as "Hippohyde", varnished cambric, or any oil-proof gasket material. The facing may be metal foil, animal membrane, sheet celluloid, non-porous leather or leather substitute, or oil paper, linen or silk. In the drawings, the rigid valve disk has secured thereto, the yielding backing layer 74 as of varnished cambric covered with the facing as of oil paper. If oiled or varnished cambric, paper, linen or silk is treated in any of the known methods to avoid the sticky surfaces, it may be used in lieu of the two-ply backing and facing construction just described. The specific relief valve described is of utility in systems other than those of the type here set forth, for instance, in the systems set forth in my patent above referred to.

In the preferred embodiment shown, the valve is formed with a stem 75 extending through an axial aperture 76 through the otherwise closed wall 77 of the fitting, with sufficient clearance to avoid substantial impedance of the oil-flow when pressure is applied to open the relief valve. The other end of stem 75 carries a piston 78 slidable in cylinder 79. Under oil pressure, the unit formed of piston 78, stem 75 and relief valve 71 is urged toward the left, until piston 78 is arrested by its seat 80, thereby assuring a definite charge of lubricant to pass through nipple 66 to the bearing. Preferably the charge measured by the valve exceeds somewhat the volume of the space between the closed relief valve and the bearing, so that pressure applied to the fitting will be transmitted to the bearing, assuring adequate charge of the latter. If desired, the charge delivered by the fitting may be less than that required to fill the bearing and the fitting beyond the seated relief valve, in which event said parts will function substantially as an oil-cup to feed the oil by gravity to the bearing with or without the aid of a wick. By adjustment of plug 72, the compression of spring 70 and the seating pressure of relief valve 67 may be regulated in accordance with requirements, whereupon the plug may be permanently sealed, if desired.

As minute solid particles, mainly chips from the pipe line, may be picked up in the travel of the oil from the pump to the fitting, even though the pump filter supplies only clean oil to the head of the line, it is preferred, in addition to filtering the oil at the pump, as already described, to provide in the relief valve fitting at the bearing, additional safeguards for intercepting any such particles picked up in the line. In the present embodiment, I have shown for this purpose an appliance, comprising a bag 81 of chamois or the like, secured by means of a few turns 82 of wire to a plug 83 threaded into a fitting element 84, which is, in turn, threaded as at 85 to the intake end of the associated pipe fitting, an interposed gasket 86 serving to make the connection oil-tight. By means of a coil spring 87, the chamois bag is maintained distended with its closed end facing the inlet nipple 88 on pipe element 84.

To prevent the entry of dirt from the bearing into the measuring fitting, I prefer to interpose an appropriate screen preferably in the nipple 66. This screen may comprise a disk 89 of straining felt seated near the lower end of the nipple and maintained in place by a metallic washer 89a sprung into a groove below the felt washer.

The single cylinder pump 40 preferably has a capacity somewhat in excess of the sum of the volumes of all of the measuring valves on the line, a by-pass duct 91 from the pump cylinder to the reservoir 43, allowing the excess oil to return to the reservoir after each measuring valve has passed its charge and has sealed the line against further egress of oil. By this means, the transmission of sufficient pressure from the pump to the various measuring valve fittings is assured, even if additional fittings are placed on the line.

*Operation*

To operate the system, the hand wheel 49 of the pump is merely rotated as far as it will go. By this simple operation, a sufficient charge of lubricant will be reliably supplied to each of the bearings on the chassis, without need for further attention. Tracing the course of the lubricant, it will be seen that by the operation set forth, the pump piston 41 is urged downward in its cylinder against the resistance of spring 42, forcing out the charge of oil past relief valve 45 and through the filter head therebelow, in which any small particles of dirt are abstracted, the pressure from the pump being transmitted throughout the length of the header 36 and the main lines 37 and 38. The pressure is thus transmitted to all of the measuring fittings one of which is shown in Fig. 3, and the location of which in the installation is indicated by letter M in Fig. 1. The piston 78 of each measuring valve is displaced by the applied pressure against the resistance of springs 70 to unseat the relief valves 67 and to force a definite charge of oil through the nipple 66 to the bearing. The discharge being limited when piston 78 seats against valve seat 80, the excess of the pump charge beyond the combined volume of the measuring valves is forced through by-pass 91 to the pump reservoir 43, a relief valve (not shown) being provided in said by-pass, if desired, to open only after all of the pressure valves have been supplied. Upon cessation of the pressure at the pump, springs 70 expand to reseat the relief or check valves 67 to close each line against leakage of oil, piston 78 having a fit sufficiently loose to permit the passage of oil therebeyond to refill the measuring compartment.

In this operation, it will be seen that the advance filter chamois bag 81 intercepts any solid particles picked up in the line by the clean oil which has been passed through the filter 50—51. The screen 89 in the nipple, prevents the entry of any dirt from the bearing to the relief valve. The entry of dirt into the relief valve is thus effectively prevented and the seating effectiveness of the relief valve is reliably maintained.

The chamois bag 81 operates with little or no absorption of pressure to intercept solid particles picked up in the line, since in the pressure operation, lubricant need not be forced through the chamois, but the oil filled bag 81 simply collapses against the resistance of spring 78, expelling the oil therefrom to feed the bearing in the manner already described. After the pump pressure is discontinued, spring 78 distends chamois bag 81 as oil seeps through to refill the latter.

It will be seen that in the system set forth, each bearing is supplied dependably with a definite measured quantity of lubricant without excessive overflow, regardless in what manner the pump is charged, that is, regardless whether the pressure transmitted through the line rises gradually to its maximum or slowly. This operation results from the fact that the piston 78 of each measuring appliance reliably seals the line against further egress of oil to the bearing as soon as the measured quantity has been delivered thereto.

In a lubricating system, in which a hand-discharged pump cylinder supplies lubricant to a plurality of bearings past relief valves, without measuring valves, it will be seen that as the discharge pressure of the pump rises, the relief valve in the line offering the least resistance to flow, will open first and pressure will be relieved through the corresponding bearing, so that the bearings may receive disproportionate charges of oil, some overflowing and others receiving too little.

In Fig. 4 is a plan view of a chassis showing an alternative lubricating installation involving fittings differing from those in Fig. 1, and an alternative form of pump charged by gas pressure, although it will be understood that other pumps may be used with the fittings here shown, and other fittings in an installation including the pump shown in Figs. 4 and 5.

The pump in this case, shown in detail in Fig. 5 is charged by engine compression to store energy in spring 92, the expansion of which effects the discharge. The prolongation of the piston stem 93 extends into a cylinder 94 through a stuffing box 95 and carries a piston head 96 movable in said cylinder. The lower end of the upper or charging cylinder is provided with a boss 97 to which is attached a pipe 98 connected at its opposite end to the top of one of the gas engine cylinders 99. A two-way valve 100 normally connects the charging cylinder with atmosphere, as shown, and may be turned by hand to connect said charging cylinder with the engine cylinder. The check valve 101 in the line adjacent the engine cylinder allows the passage of compressed gas from the engine to the charging cylinder, while preventing reverse flow from the charging cylinder during the suction stroke of the engine cylinder.

The piston stem 93 continues up through an aperture 102 in the cover of the charging cylinder and its end is provided with a handle 103 by which the pump may be manually charged, if desired, or required.

In the chassis of Fig. 4, I have shown measuring valve appliances N disposed in the run of the line near the bearings, rather than directly connected to the bearings, as in Fig. 1. A preferred form of these appliances is shown in Fig. 6 and will be described below. Although these measuring valve appliances are preferably provided with relief valves to maintain the line filled, it is preferred to provide further relief valves immediately adjacent the bearings in the form of fittings attached to the bearings in the manner of oil cups. These fittings are best shown in Fig. 7 and will be described below. By the use of two relief valves in series, the line will be reliably maintained filled, even if one of the relief valves on any line should become disabled.

Although the measuring and relief valve fittings shown by N and C may be used at each bearing in the line, they are shown in Fig. 4 connected at the spring shackles and spring bolts, each for supplying a single spring shackle or bolt. The two brake links upon each rear wheel are supplied in parallel from a single measuring valve N. At the left front of Fig. 4 is shown a measuring plug N feeding a swivel 105 on top of the king pin, two pipes 106 and 107 leading from the swivel to adjacent bearings on the steering knuckle and third arm respectively. A relief valve C is preferably provided immediately in advance of each of the three bearings. The charge passed by measuring valve N thus is divided and a portion flows past each of the relief valves to the associated bearing.

The measuring valve appliance N, Fig. 6, comprises a pipe fitting 107 having a transverse interior ledge 108 affording a seat 109 for a valve 110 provided preferably with the varnished cambric and oil paper seating surface 111, heretofore described. The valve has a stem 112 at the end of which is a piston 113 slidable in a cylinder portion 114 on a fitting section 115 threaded to the fitting element 107. A coil spring 116 encircles shank 112 and normally maintains the valve 110 against its seat 109. A groove 117 in the cylinder 115 allows the entry of the lubricant when the appliance is in the idle position shown in the drawings into the chamber 118 between piston-head 113 and seated relief valve 110. The valve stem 112 is provided with a longitudinal groove 119 terminating between the ends of the stem through which the lubricant can pass when the valve is unseated in operation.

In advance of the piston 113 at the intake end of the fitting, I provide straining means to intercept any solid particles picked up in the line. In this embodiment, I have shown an alternative form of straining means comprising a disk 120 of felt. Preferably an extremely fine-wire mesh screen 121 is disposed behind the felt disk 120 and is clamped against the retaining shoulder 122 by pressure transmitted through the felt 120 from the split ring 123, which retains the strainer in position. The wire mesh screen serves to intercept any fine hairs that may be released from the felt and thereby prevents any possibility of such hairs finding their way to the valve seat 109 and interfering with the effectiveness of the relief valve.

The relief valve fitting C at the end of the line is shown in Fig. 7. This fitting includes an element 124 telescoped over and soldered to the end of the oil feeding line 125. The interior of element 124 is bored with a hole providing a conical seat 126 for valve 127 urged to seating position by a spring 128 held under compression by a plug 129 threaded into element 124 and having a hole 130 drilled therethrough. A plug 131 is threaded into the bearing 132 and has a longitudinal bore 133 for the oil. The element 124 has a flange 134 clamped against plug 131 by union nut 135 in the manner shown in the drawings.

To operate the installation shown in Fig. 4, the operator turns the two-way valve 100, whereupon the compression and explosion pressure on top of the gas engine cylinder 99 is transmitted through the check valve 101 and small pipe 98 into the charging cylinder 94. The check valve prevents the compressed gas from returning to the cylinder of the gas engine and thus the compressed gas lifts the power piston head 96 to the upper end of its stroke against the resistance of spring 92. When this has occurred, the operator releases the two-way valve, which is returned by its spring (not shown) to the original position, shown in the drawings, whereupon the gas contents of the charging cylinder below the piston head escape through the valve 100 to atmosphere, as spring 92 expands to urge the pump piston and power cylinder head downward in discharging the pump, while air enters through the atmospheric connection 136 at the top of the charging cylinder. By locating the two-way valve below the charging cylinder and below the top of the gas engine, as shown, any moisture that may have been contained in the compressed gas is free to drain out into the air through the two-way valve 100.

The pressure is transmitted from the pump to the mains, to force pistons 113 in fittings N to the ends of their stroke, so that the measured quantity of lubricant confined by valves 110 is released to pass the measured quantity of oil to the associated bearing. When the pressure ceases, spring 116 returns valve 110 to seating position, and spring 128 reseats valve 127, so that the relief valves prevent leakage from the filled line, at all times. The filter arrangement operates to prevent impairment of the operativeness of the relief valves in a manner already described.

The appliance of Fig. 8 is arranged to feed a measured quantity through one outlet and the excess to another bearing, past a relief valve, the passage to which is opened after the measured charge has been expelled. The measuring valve portion of this fitting is preferably substantially identical with that of Fig. 6 and need, therefore, not be described. The piston 173 normally seals the outlet to relief valve 174 in a nipple 175, projecting laterally from the fitting. The relief valve is exposed when the piston reaches the bottom of the stroke, so that the excess is ejected therethrough to the bearing.

The fittings in Figs. 9 and 10 are shown mounted one on each of the two front shackle pins, although either type may, of course, be used at both places or at any other bearing desired. These fittings are adapted to receive a charge of oil from an individual cylinder and pass a portion of it direct to the bearings, while storing the remainder of the charge in an adjacent oil cup structure. This stored remainder feeds the bearing for a considerable period thereafter, thus lubricating the bearing throughout an extended period, between the intervals of oil feed from the pump.

Fig. 9 shows a shackle pin 175 connected to an oil line provided with a check valve 176 at its end. Between the two, a fitting 177 is formed with a base 178 for an oil cup 179 having an upper air vent 180 protected from dust by a threaded cap 181 and arranged to be automatically closed when the oil in the cup has reached near the top thereof. A tube 182 serves as a support for a cork float 183 carrying a valve 184 and guided vertically by a stem 185 within the tube. The lower part of the tube is drilled with a hole 186 through which extends a spiral wick 187, the convolutions of which lie on the base of the cup, and the free end 188 of which depends loosely in the vertical tube.

In the operation of this device, a charge of oil from the pump enters past the check valve 176 and goes to the shackle pin bearing 175. Such oil as is not immediately forced through the bearing travels up past the wick 187 through the tube 182 under the cork float 183, near the top of the oil cup. The air therein contained is free to escape through the vent 180 and past vent 180' in the cap, until the level of oil has risen, so that the cork is lifted and the valve pressed up against its seat, whereby the escape of oil from the cup is prevented. While the oil pressure persists, the air vent is held closed in this position and upon the release of oil pressure by the pump going to the end of its stroke, the oil leaks into the bearing of the shackle pin and the float 183 drops, admitting air to the cup. This permits the oil to seep out through the wick to the shackle pin, while the line is held full by the ball check 176 at the right.

The device shown in Fig. 10 includes a measuring valve 189 which may be of the type shown in Fig. 3 or Fig. 6. Adjacent the bearing is a short pipe fitting 190 formed integral with an oil cup 191 closed air-tight, by cover 196. A vertical tube 192 therein contains a loose-fitting vertical wick 193 whose end 194 lies loosely in the oil cup. The wick is held from dropping down or from being forced up by the oil stream, by means of a helical wire 195 wound around it and abutting against the cover 196 of the cup at its upper and the wall of the pipe 190 at its lower end.

In operation, when oil is forced into the bearing, the excess passes up by the wick 193 into the cup, compressing above it such air as may be contained therein until no more oil enters. When the pressure has subsided, the oil in the cup seeps out through the wick 193, being assisted in its escape by the pressure of the compressed air in the cup, the relief valve element of measuring valve 189 acting as a check valve to prevent feed of oil in the wrong direction.

It will be understood that oil storing fittings of the general type shown in Figs. 9 and 10 could be used advantageously in an installation of the type described in my copending application or in my Patents 1,632,771, 1,732,212 and 1,746,139 above referred to, and particularly for lubrication of bearings, such as the spring shackle bolts, where the oil may be used more rapidly than at other bearings. In such application, the storing fittings would be applied in the manner above described, the oil being, however, delivered thereto through seepage or drip elements of the type shown in the copending application, and stored therein for slow feed therefrom to the associated bearings. The remaining bearings in such installation would be supplied through seepage fittings connected thereto in the manner disclosed in said application. Thus, bearings requiring more oil would be supplied from an oil cup filled through a seepage fitting set for rapid drip, which may be supplied directly to the storing fitting, while the other bearings on the line would be supplied through seepage fittings connected directly thereto. It will also be understood that measuring valve fittings of any of the types shown in the drawings may be applied in an installation of the type described in my said copending application or in my said patents, at any bearing at which oil feed, under pressure, is desirable.

Any of the installations heretofore described may also be provided with additional fittings for supplying lubricant at places other than those indicated in the drawings. For instance, in vehicles provided with brakes on the front wheels, as well as on the rear wheels, measuring valves or seepage fittings, may be provided for the front brake links and supplied from the pressure mains in the embodiments of Figs. 1 and 4. Lubricant may also be supplied in a similar manner at the rubbing surface of the leaf springs.

The various constructions of measuring valves heretofore described, are, of course, not limited in their applications in the specific relation shown in the drawings, which are largely illustrative, but each of these fittings is of general application to substantially any bearing or bearings. In general, however, where a single pump cylinder concurrently supplies a plurality of bearings, measuring valve appliances are preferably employed, to limit the charge to each bearing, supplying one or a few contiguous bearings, the pump cylinder itself constitutes the measuring element and the lines are kept full by simple relief valve terminals, as in Fig. 7.

I have shown a number of other alternative multiple measuring valve fittings of general application, now to be described.

*Alternative multiple measuring valves*

The device shown in Fig. 11 furnishes a measured quantity of oil to several pipes in succession, which pipes lead to neighboring bearings. This device consists of a fitting 197 having a cylindrical end closed by a cap 198 threaded to receive the inlet pipe and closed at the opposite end by cap 199. A spring 200 encircling piston stem 201 reacts against neck 202 of the fitting and urges the piston head 203 toward cap 198. The forward portion of neck 202 is formed into a valve seat 204 and the advanced end of the piston stem 201 is enlarged to form a relief valve 205 which fits on and is urged against the valve seat by the expansion of spring 200. The relief valve 205 is connected with a cylindrical slide valve 206 having ports 207, 208 and 209, which in succession, register respectively with nipples 210, 211 and 212 threaded for connection to pipes which lead to the bearings. The cylinder in which the piston head slides is provided with a groove 213 extending down into the lower end of the cylinder, through which oil enters the cylinder, so that the latter is normally filled. As the hollow cylindrical slide valve 206 is moved down by pressure transmitted through the oil, overcoming spring 200, relief valve 205 opens and oil escapes past said valve to the chamber therebelow. Oil passes from the chamber first through the left-hand nipple 210 until the motion of the slide valve closes its outlet, whereupon the next quantity of oil passes through the port 208 into the right-hand outlet 211 and after this is closed by further motion of the slide valve, another charge passes into the outlet 212 shown in dotted lines as behind the fitting. At the end of the stroke, a conical valve 203' below the piston head enters and seals the valve seat 214 into which it fits, thus preventing further escape of oil. When the pressure in the entering line falls, so that the spring can push the piston up, the piston moves up and oil flows past it through the groove 213 in the side of the cylinder, filling the cavity below the piston head, further escape of oil through the groove being prevented when the valve 205 at the bottom of the piston stem seals the valve seat into which it fits.

In Figs. 12 and 13 is shown a measuring device for forcing measured quantities of oil to three outlets simultaneously. This device consists of a fitting block 215 having a cylindrical cavity 216 at one end and bored with four longitudinal holes 217, 218 of smaller diameter, as shown, communicating with the cylinder 216. The central hole 218 extends only part way through the casting and contains a coil spring 219 for urging upward the piston head 220 which fits into the cylinder 216 and to which are threaded three solid pistons 221 which fit respectively into the three other holes 217. Into the other end of each of the solid pistons is screwed a stem 222 carrying at its lower end a valve head 223 urged toward a stop pin 224 in the stem by a dished washer spring 225. By reason of the yielding mount of valves 223, seating thereof is assured even though there be small irregularities in machining. The upper end of the cylinder 216 is closed by the threaded cap 226 having an extension 227 threaded to receive the inlet pipe, and the lower ends of cylinders 217 are closed by individual outlet plugs. A groove 229 extends down the side of the cylinder and somewhat into the end of the cylinder, as shown, substantially as in Fig. 12, and each of the solid pistons has a longitudinal groove 230 to communicate with the valve chamber 231 therebelow.

Upon application of pressure at the pump, oil depresses the piston head 220 and with it the three solid pistons 221. As the latter move down, they expel the oil within the cylinders 217 past the now open valves 223 into chambers 231 from which the oil passes through outlet plugs 228 to the bearings. At the end of the stroke, the piston head 220 seats upon and seals the cylinders 217, so that no more oil enters and the valves 223 seat upon the outlet plugs 228 and seal the three outlet passages, so that no further oil escapes to the bearings, the latter receiving merely the measured quantity. When the pressure falls sufficiently to permit the spring 219 to lift the piston head, oil flows through the groove 229 at the side of the main cylinder into the cavity below the piston head. Oil further flows through grooves 230 in the sides of the solid pistons 221 into the cavities 231 below them, so that when the piston head is at the top of its stroke, and valves 223 are seated, the space in the cylinders between the solid pistons and the seated valves is filled with oil, to be delivered to the bearing for the succeeding charge.

Another form of multiple measuring valve appliance is shown in Fig. 14. A cylindrical pipe fitting 232 has a plurality of integral lateral outlet nipples 233 for distribution of lubricant to the bearings and encloses a sliding piston 234 having a yielding seating end 235 similar to the relief valves already described, urged against valve seat 236 formed integral with the fitting by a coil spring 237 reacting against the closure plug 238, which is threaded into the end of the fitting. The piston 234 has a plurality of measuring cavities 239 in the side thereof normally maintained out of registry with the outlet nipples 233, the upper ends of said valves being normally in communication with the circumferential groove 240 in the fitting. A pin 241 through the fitting extends into one of the cavities 239 to retain the piston against rotary displacement.

In the inlet end of the fitting, preferably adjacent the valve seat, I provide a felt plug 242 serving as a screen to prevent the entry into the fitting of any solid particles picked up in the line, this plug being preferably backed by a small mesh metal screen 243, to intercept any hairs released from the felt in operation.

In operation, as pressure is applied to the fitting, the valve 234 moves against the opposition of spring 237 away from seat 236, interrupting communication between the groove 240 and the cavities 239 and bringing said cavities into registry with the outlet nipples 233 through which the predetermined charge of oil in each cavity escapes by gravity to the corresponding bearing. When the pressure is released, spring 237 expands, effecting return movement of the valve, during which lubricant flows past the open relief valve through the groove 240, to refill the cavities 239 until the valve is reseated as shown in the drawings, to maintain the line in advance thereof filled with oil.

It is to be understood, of course, that the pump and measuring valve constructions specifically disclosed may be used in other combinations than those shown as for example in the combination shown in the copending application Serial No. 580,668, now Patent No. 1,975,920 and that these pump and measuring device elements may also be employed to lubricate other machinery than automobile chassis.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. As an element in a pressure lubricating system, a pipe fitting having a valve seat therein, a relief valve, a spring urging said valve against its seat and a filter bag of chamois or the like collapsible under pressure and in the path of lubricant flow.

2. In a relief valve fitting to be applied to a bearing, in combination, a delivery nipple to be applied at the bearing, an intake nipple for application to a pipe line, a relief valve spring seated in said fitting, screen means preassembled therein between said intake and said valve to intercept solid particles carried with the lubricant to the fitting, and a second screen means across said nipple to intercept the passage of dirt from the bearing to the relief valve, whereby solid particles will be kept from said valve seat.

3. An elbow-pipe fitting having a nipple to be threaded into a bearing, a transverse wall across the main length of the fitting, a relief valve, a spring seating said valve against said transverse wall, said valve having a stem extending axially through said wall, means on said stem limiting the unseating movement of said valve, and a union fitting threaded upon said first fitting to serve as a connection for a conduit length, said union fitting having filter means pre-assembled therein for intercepting solid particles carried with the oil.

4. In a lubricating system, in combination, a bearing, a source of lubricant remote therefrom, a conduit connecting said source to said bearing, means for ejecting oil under pressure to said conduit, a relief valve in said conduit near said bearing, a spring for firmly engaging said valve with its seat, filter means in said conduit near said pump to intercept solid particles in the lubricant, said filter means having relatively low resistance to permit passage of the lubricant without substantial absorption of pressure, and screen means interposed between said relief valve and the bearing to prevent the entry of dirt from the latter to the former.

5. A central lubricating system including a source of lubricant pressure, distributing piping supplied therefrom and having branches leading to the various parts to be lubricated, valves normally closing off the flow through said branches, each of said valves having an associated protective screen, said screen comprising a cup structure, with its closed end subject to pressure transmitted from the source, for displacement under said pressure, said cup structure including a membrane part, and spring means to return said cup structure to normal position.

6. A centralized lubricating system, including a source of lubricant pressure, distributing piping supplied therefrom, and leading to the parts to be lubricated, and measuring valves in said piping, each of said measuring valves including a part to normally seal the outlet and prevent leak from the piping, each of said measuring valves including a screen to protect the parts thereof, said screen comprising a membrane cup structure with its closed end subjected to pressure transmitted from the source, for displacement under said pressure.

7. A centralized lubricating system, including a source of lubricant pressure, distributing piping supplied therefrom, and leading to the parts to be lubricated, and measuring valves in said piping, each of said measuring valves including a part to normally seal the outlet and prevent leak from the piping, each of said measuring valves including a screen to protect the parts thereof, said screen comprising a membrane cup structure with its closed end subjected to pressure transmitted from the source, for displacement under said pressure, the membrane screen comprising a cup-shaped element of chamois having a spring therein holding the same distended, with its open end toward the bearing.

8. A centralized lubricating system, including a source of lubricant pressure, distributing piping supplied therefrom, and leading to the parts to be lubricated, and measuring valves in said piping, each of said measuring valves including a part to normally seal the outlet and prevent leak from the piping, each of said measuring valves including a screen to protect the parts thereof, said screen comprising a membrane cup structure with its closed end subjected to pressure transmitted from the source, for displacement under said pressure, the source of pressure consisting of a pump provided at its outlet with a filter of large area and relatively low resistance, serving to protect the membranes at the measuring valves from clogging with any fine solid particles carried by the oil, the membranes serving to intercept coarser solids in the line of flow through the piping.

9. A central lubricating system including a hand-discharged, spring-returned, single-cylinder, plunger pump, distributing piping leading therefrom to the parts to be lubricated, measuring valves in said piping, each of said valves having a seating part and an associated coil spring maintaining the valve seated, each of said valves having a screen cup at its inlet, yielding under pressure transmitted from the pump and automatically restored as the pressure drops, to slowly pass lubricant therebeyond, and a filter of large area and low resistance to flow at the outlet of the pump, serving to protect said measuring valve screens from becoming clogged with fine solid particles.

10. A central chassis lubricating system comprising a distributing piping system having an inlet and a plurality of outlet branches, measuring valves in said branches, each to discharge a predetermined volume of lubricant under a pressure impulse applied at the inlet, a pump having a cylinder affixed at said inlet and a plunger therein, said pump having a volume in excess of the combined effective volumes of said measuring valves, and a spring closed valve to permit escape of the excess lubricant from the pump cylinder in the final portion of the pump stroke, said spring closed valve responding to a pressure greater than that of said measuring valves.

11. In a central lubricating system, the combination of a distributing piping system having an inlet and a plurality of outlet branches, measuring valves in said branches, each intercepting a definite charge of lubricant and emitting it, consequent upon pressure applied at the inlet, a lubricant supply installation at said inlet including a lubricant reservoir and an associated pressure pump of the plunger type, emitting through said inlet, the volume of said pump exceeding the combined charges of said measuring valves, and a by-pass connecting the discharge end of said pump with said reservoir and having a relief valve seated during operation of the measuring valves and responding to the higher pressure generated near the end of the plunger stroke after the measuring valves have executed their movement, to open and return the balance of the pump charge to the reservoir.

12. A measuring valve for a lubricating system, comprising a fitting adapted for application to a bearing, a measuring valve unit including a stem having enlargements at the opposite ends thereof, said stem extending with small clearance through a corresponding bore in said fitting, one of said enlargements constituting a valve, and a spring beyond said valve and said stem for seating said valve.

13. A measuring valve for a lubricating system, comprising a fitting adapted for application to a bearing, a measuring valve unit including a stem having enlargements at the opposite ends thereof, said stem extending with small clearance through a corresponding bore in said fitting, one of said enlargements constituting a valve, and a spring beyond said valve and said stem for seating said valve, a plug being provided which is accessible from the exterior and which is adjustable to regulate the pressure of the valve-seating spring.

14. A measuring valve for a central lubricating system, said valve comprising a fitting including a laterally extending nipple for application at a bearing, a plunger comprising a stem having an enlargement at each end thereof, said stem extending with small clearance through a corresponding bore longitudinally of the fitting, one of said enlargements constituting a valve in the corresponding part of the fitting, a seat for said valve and a coil spring aligned with said plunger and beyond the end thereof for urging said valve against its seat.

15. A measuring valve for a central lubricating system, said valve comprising a fitting, a plunger stem extending longitudinally with small clearance through a bore in said fitting of nearly the length of said stem, an operating piston on said stem and in a correspondingly larger bore at the inlet part of said fitting, a valve on said stem and in a corresponding cavity at the outlet part of said fitting, said fitting affording a seat for said valve, and means beyond said stem urging said valve against said seat.

16. A fitting for a central chassis lubricating system, including a flow control element, protective means in advance thereof to intercept any solid particles carried with the lubricant, said protective means comprising a cup-shaped membrane, and means urging the closed end of said membrane outward toward the inlet of said fitting, whereby said cup will collapse under pressure.

17. A protective inlet element for a pressure operated flow controlling device, said element comprising a fitting having means at one end thereof for application of a supply pipe, and means at the other end for application to the flow controlling device, said fitting including a cup-shaped chamois element within a corresponding cavity in the fitting, with the closed end of said cup in the path of lubricant admitted to the protective element, a perforated plug mounting the rim of said chamois cup and fitted in the outlet end of said fitting, and a coil spring within said chamois cup maintaining the latter normally distended.

18. In a remote control lubricating system, in combination, a bearing, a source of lubricant pressure, a conduit connecting said source to said bearing, a relief valve in said conduit near said bearing to be opened by the application of pressure for ejecting a charge of lubricant into the bearing, and a resiliently charged and discharged oil cup connected to said conduit between said relief valve and said bearing for storing a charge of oil to be fed to the bearing as the oil therein is used, said cup being in continuous open communication with said bearing and being provided with a wick to assure a continuous slow flow to said bearing.

19. In a lubricating installation, in combination, a bearing, a source of lubricant pressure remote therefrom, a conduit, a fitting connecting said conduit to said bearing, said fitting including a short length of pipe, an oil cup communicating therewith and between the ends thereof, and an air-tight seal for said oil cup, whereby upon application of pressure from said source, lubricant will be supplied through said fitting to said bearing and excess lubricant will enter said oil cup to compress the air therein, said cup being in continuous open communication with said bearing and being provided with a wick to assure a continuous slow flow to said bearing.

20. In a liquid feed system, in combination, a source of lubricant under pressure, a plurality of measuring valve fittings in communication with said source, each said valve fitting having two cylindrical chambers connected by a passageway, one of said chambers serving as a measuring chamber and adapted to contain a lubricant charge and each chamber being provided with a piston valve with stem means to be received in said passageway, spring return means associated with said piston valves and means for applying pressure concurrently to the liquid in advance of said pistons for forcing the pistons toward the ends of their discharge strokes to eject a measured quantity of liquid from each measuring valve fitting, the adjacent inside faces of said pistons having non-metallic annuli associated therewith and positioned by said stem means to seal the measuring chamber against feed respectively after the measured quantity has been delivered and after return of the pistons.

21. In a composite lubricant supply valve, in combination, a measuring valve comprising a cylinder and a piston operated by pressure upon the lubricant, a relief valve exposed to the pressure of said lubricant when said piston passes through a predetermined stroke, and expels lubricant, a return spring means for said piston and said valve and a threaded adjusting plug means for varying the compression of said spring means.

22. In a lubricating installation, in combination, a bearing, a source of lubricant under pressure remote therefrom, a conduit, a fitting connecting said conduit to said bearing, said fitting including a short length of pipe, an oil cup communicating therewith and between the ends thereof, and an air-tight seal for said oil cup, whereby upon application of pressure from said source, lubricant will be supplied through said fitting to said bearing and excess lubricant will enter said oil cup to compress the air therein, a wick being provided to connect the bottom of the oil cup to the length of the pipe fitting and a length of wire being coiled about said wick, said wire coacting with the top of said oil cup and a wall of said pipe fitting to limit the displacement of said wick.

23. In a remote control lubricating system, in combination, a bearing, a source of lubricant pressure remote therefrom, a pipe connecting said source to said bearing, a measuring valve in said pipe, including a measuring piston valve and a check valve in series and being substantially removed from its bearing, a spring for seating said measuring valve, said valve having a yielding, non-sticking seating surface, and a pressure-operated relief valve in said line between said bearing and said measuring valve.

24. A centralized lubricating system for a motor vehicle with a source of fluid pressure actuated under operation of the engine, comprising a piping system with measuring outlets, a pump having a lubricant discharging piston member and a spring for returning said member, and a motor for said pump including a fluid actuated part rigidly connected with the discharging member adapted to be actuated from said source, and means for intermittently connecting said motor for operation to said source.

25. A centralized lubricating system for a motor vehicle with an engine including a compression chamber, comprising a piping system with measuring valve metering outlets, a spring discharged piston pump, a fluid motor including a cylinder aligned with said pump cylinder and having a piston therein rigidly connected with said pump piston, means connecting said motor cylinder from time to time with the compression chamber of the engine, for energizing said pump spring, said means in normal disconnected position venting said power cylinder to allow the spring to discharge the pump.

26. In a central lubricating system for a plurality of bearings, a lubricant metering outlet consisting of a measuring valve having a longitudinal body with an inlet port from the system, a relatively large diameter measuring cylinder, a relatively small diameter interior cylindrical discharge port from said cylinder, a cylindrical piston closely fitting in said cylinder and provided with a return spring, said piston having sufficient clearance in respect to said cylinder to be filled with lubricant upon relatively slow feed through the inlet port when it is at the return end of its stroke but insufficient clearance to keep it from being displaced to discharge through said discharge port a lubricant charge upon a forward stroke when actuated by a pressure impulse upon the lubricant through the inlet port, a plurality of reciprocating valve means actuated by said piston to take forward and return strokes simultaneously therewith, one valve means serving to prevent further discharge through said discharge port when said piston has completed its forward discharge stroke and another valve means serving to prevent discharge from said cylinder through said discharge port when said piston is at the return end of its stroke and said cylinder has been filled with lubricant, said discharge port being formed so as to provide seats for each of said valve means.

27. In a central lubricating system for a plurality of bearings, a lubricant metering outlet consisting of a measuring valve having a longitudinal body with an inlet port from the system, a relatively large diameter measuring cylinder, a relatively small diameter interior cylindrical discharge port from said cylinder, a cylindrical piston closely fitting in said cylinder and provided with a return spring, said piston having sufficient clearance in respect to said cylinder to be filled with lubricant upon relatively slow feed through the inlet port when it is at the return end of its stroke but insufficient clearance to keep it from being displaced to discharge through said discharge port a lubricant charge upon a forward stroke when actuated by a pressure impulse upon the lubricant through the inlet port, a plurality of reciprocating valve means actuated by said piston to take forward and return strokes simultaneously therewith, one valve means serving to prevent further discharge through said discharge port when said piston has completed its forward discharge stroke and another valve means serving to prevent discharge from said cylinder through said discharge port when said piston is at the return end of its stroke and said cylinder has been filled with lubricant, said discharge port being formed so as to provide seats for each of said valve means, said first mentioned valve means taking the form of a disk of a yielding, non-sticking, seating material on the inside rear face of said piston and said second mentioned valve means including a piston and a stem rigidly connected together, said stem projecting into the outlet end of said outlet port and said last mentioned piston having a similar seating material on its forward face, the valve seats being provided at the inlet and outlet ends of said outlet port.

28. In a central lubricating system for a plurality of bearings, a lubricant metering outlet consisting of a measuring valve having a longitudinal body with an inlet port from the system, a relatively large diameter measuring cylinder, a relatively small diameter interior cylindrical discharge port from said cylinder, a cylindrical piston closely fitting in said cylinder and provided with a return spring, said piston having sufficient clearance in respect to said cylinder to be filled with lubricant upon relatively slow feed through the inlet port when it is at the return end of its stroke but insufficient clearance to keep it from being displaced to discharge through said discharge port a lubricant charge upon a forward stroke when actuated by a pressure impulse upon the lubricant through the inlet port, a plurality of reciprocating valve means actuated by said piston to take forward and return strokes simultaneously therewith, one valve means serving to prevent further discharge through said discharge port when said piston has completed its forward discharge stroke and another valve means serving to prevent discharge from said cylinder through said discharge port when said piston is at the return end of its stroke and said cylinder has been filled with lubricant, said discharge port being formed so as to provide seats for each of said valve means, said valve means including valve elements carried by a stem connected to said piston and said stem projecting through said outlet port, said stem having an intervening recessed portion between said valve elements.

29. In a central lubricating system for a plurality of bearings, a lubricant metering outlet consisting of a measuring valve having a longitudinal body with an inlet port from the system, a relatively large diameter measuring cylinder, a relatively small diameter interior cylindrical discharge port from said cylinder, a cylindrical piston closely fitting in said cylinder and provided with a return spring, said piston having sufficient clearance in respect to said cylinder to be filled with lubricant upon relatively slow feed through the inlet port when it is at the return end of its stroke but insufficient clearance to keep it from being displaced to discharge through said discharge port a lubricant charge upon a forward stroke when actuated by a pressure impulse upon the lubricant through the inlet port, a plurality of reciprocating valve means actuated by said piston to take forward and return strokes simultaneously therewith, one valve means serving to prevent further discharge through said discharge port when said piston has completed its forward discharge stroke and another valve means serving to prevent discharge from said cylinder through said discharge port when said piston is at the return end of its stroke and said cylinder has been filled with lubricant, said discharge port being formed so as to provide seats for each of said valve means, said valve means being formed on a stem rigidly connected to said piston and said stem projecting through said outlet port, said stem having an enlarged portion closing one end of said port at one extreme of the piston stroke and having a cylindrical portion completely filling and closing said outlet port at the other extreme of the piston stroke, and also having a recessed portion therebetween to permit flow through said outlet port during the intermediate portions of the stroke.

30. In a lubricating installation, having a reservoir, a piston pump supplied from said reservoir, a conduit leading toward bearing means substantially completely filled with lubricant and means for actuating said pump to intermittently discharge lubricant into said conduit, a measuring valve fitting unit having an elongated cylindrical body with threaded inlet nipple means for connection to said conduit and threaded outlet nipple means for connection to said bearing means, said body including a relatively large diameter cylindrical chamber, inlet port means in said inlet nipple means and outlet port means in said outlet nipple means, a reciprocating piston valve consisting of a substantially solid metal cylinder provided with a return spring in said chamber, the sides of which piston have a metallic contact with the walls of said chamber, said piston valve closely fitting within said chamber with sufficiently small clearance to permit leakage of lubricant thereby between the sides of the piston and the walls of the chamber, whereby said return spring may return said piston displacing the lubricant from the inlet side of the piston to the outlet side through said clearance, said piston subsequently moving forwardly against said spring to carry forward said displaced lubricant and to cause it to flow outwardly through said outlet port means upon intermittent pressure application to its inlet face by said pump, said pump upon each discharge reciprocation of said piston discharging a volume of lubricant into said conduit in excess of the total volume of said chamber and at a pressure substantially in excess of the closing pressure of said spring and means to relieve said conduit of said excess.

31. In a lubricating installation, having a reservoir, a piston pump supplied from said reservoir, a conduit leading toward bearing means substantially completely filled with lubricant and means for actuating said pump to intermittently discharge lubricant into said conduit, a measuring valve fitting unit having an elongated cylindrical body with threaded inlet nipple means for connection to said conduit and threaded outlet nipple means for connection to said bearing means, said body including a relatively large diameter cylindrical chamber, inlet port means in said inlet nipple means and outlet port means in said outlet nipple means, a reciprocating piston valve consisting of a substantially solid metal cylinder provided with a return spring in said chamber, the sides of which piston have a metallic contact with the walls of said chamber, said piston valve closely fitting within said chamber with sufficiently small clearance to permit leakage of lubricant thereby between the sides of the piston and the walls of the chamber, whereby said return spring may return said piston displacing the lubricant from the inlet side of the piston to the outlet side through said clearance, said piston subsequently moving forwardly against said spring to carry forward said displaced lubricant and to cause it to flow outwardly through said outlet port means upon intermittent pressure application to its inlet face by said pump, the cylinder of said piston valve being provided with a forwardly projecting stem, the forward end of said stem being provided with an annularly projecting valve member and said unit being provided with a cooperating valve seat, said valve member and said seat cooperating together to hold said displaced lubricant in said chamber during the intervals between said intermittent discharges after said piston valve has completed its return stroke, said pump upon each discharge reciprocation of said piston discharging a volume of lubricant into said conduit in excess of the total volume of said chamber and at a pressure substantially in excess of the closing pressure of said spring and means to relieve said conduit of said excess.

32. A central lubricating installation for a mechanism having a plurality of spaced bearings to be lubricated comprising a branched conduit system substantially completely filled with lubricant, a piston pump for injecting charges of oil intermittently into the inlet of said system, means for operating said pump to cause such intermittent injection, an oil reservoir supplying said pump and measuring valve means connecting each of the outlets of said system to said bearings, each of said measuring valve means including a fitting provided with a measuring chamber enclosing a reciprocating piston valve closely fitting within said chamber with a small clearance to permit slow leakage thereby under pressure, an outlet check valve and spring return means for said piston valve and said check valve; said reciprocating piston valve being held at one end of said chamber by said spring return means and said chamber being held full of oil by said check valve preventing flow out of said chamber during the periods between intermittent injections by said pump; said piston valve and said check valve being moved against said spring return means upon injection by the pump whereby said piston valve will eject a measured quantity of oil past said check valve towards its bearing; and said spring return means after operation of said pump serving to return said piston valve and said check valve, said piston valve returning by reason of leakage past it whereby after return of said piston valve and said check valve said chamber will again be filled by said leakage, said pump upon each discharge reciprocation of said piston, discharging a volume of lubricant into said system in excess of the total combined volume of said chamber and at a pressure substantially in excess of the strength of said springs, and means to relieve said system of said excess of lubricant.

33. A central lubricating installation for a mechanism having a plurality of spaced bearings to be lubricated comprising a branched conduit system, a pump for injecting charges of oil intermittently into the inlet of said system, means for operating said pump to cause such intermittent injection, an oil reservoir supplying said pump and measuring valve means connecting each of the outlets of said system to said bearings, each of said measuring valve means including a fitting provided with a measuring chamber enclosing a reciprocating piston valve closely fitting within said chamber with a small clearance to permit slow leakage thereby under pressure, an outlet check valve and spring return means for said piston valve and said check valve; said reciprocating piston valve being held at one end of said chamber by said spring return means and said chamber being held full of oil by said check valve preventing flow out of said chamber during the periods between intermittent injections by said pump; said piston valve and said check valve being moved against said spring upon injection by the pump whereby said piston valve will eject a measured quantity of oil past said check valve towards its bearing; and said spring means after operation of said pump serving to return said piston valve and said check valve, said piston valve returning by reason of leakage past it whereby after return of said piston valve and said check valve said chamber will again be filled by said leakage, said installation also including a valved return to said reservoir actuated into open position only after the discharge operation of said measuring valve means has been substantially completed.

34. A lubricating system for machine bearings, comprising a lubricant reservoir, a conduit having branches substantially completely filled with lubricant, each connected to a bearing to be lubricated, a reciprocating piston pump mechanism for intermittently producing pressure in the conduit and simultaneously supplying a quantity of lubricant thereto, and measuring valve means located in each branch accurately to apportion the quantity of lubricant delivered from each branch to its bearing in predetermined relative quantities dependent upon the requirements of the individual bearings, independently of the bearing resistances, each of said measuring valve means including a fitting provided with a measuring chamber enclosing a reciprocating piston valve closely fitting within said chamber with a small clearance to permit slow leakage thereby under pressure, an outlet check valve and spring return means for said piston valve and said check valve; said reciprocating piston valve being held at one end of said chamber by said spring and said chamber being held full of oil by said check valve preventing flow out of said chamber during the periods between intermittent injections by said pump; said piston valve and said check valve being moved against said spring upon injection by the pump whereby said piston valve will eject a measured quantity of oil past said check valve towards its bearing; and said spring means after operation of said pump serving to return said piston valve and said check valve, said piston valve returning by reason of leakage past it whereby after return of said piston valve and said check valve said chamber will again be filled by said leakage, said pump upon each discharge reciprocation of said piston, discharging a volume of lubricant into said system in excess of the total combined volume of said chamber and at a pressure substantially in excess of the strength of said springs, and means to relieve said system of said excess of lubricant.

35. In an automobile, a lubricant reservoir, pressure supply means including a reciprocating piston pump deriving its lubricant from said reservoir, connections substantially completely filled with lubricant between a bearing of the vehicle and said pressure supply means, measuring valve metering means in said connections, said pressure supply means operable at intervals by the motor mechanism of the vehicle to enable said lubricant pressure supply means to force and inject lubricant into said connections, each of said measuring valve means including a fitting provided with a measuring chamber enclosing a reciprocating piston valve closely fitting within said chamber with a small clearance to permit slow leakage thereby under pressure, an outlet check valve and spring return means for said piston valve and said check valve; said reciprocating piston valve being held at one end of said chamber by said spring and said chamber being held full of oil by said check valve preventing flow out of said chamber during the periods between intermittent injections by said pump; said piston valve and said check valve being moved against said spring upon injection by the pump whereby said piston valve will eject a measured quantity of oil past said check valve towards its bearing; and said spring means after operation of said pump serving to return said piston valve and said check valve, said piston valve returning by reason of leakage past it whereby after return of said piston valve and said check valve said chamber will again be filled by said leakage, said pump upon each discharge reciprocation of said piston, discharging a volume of lubricant into said system in excess of the total combined volume of said chamber and at a pressure substantially in excess of the strength of said springs, and means to relieve said system of said excess of lubricant.

36. In a machine having a power mechanism for actuating the same, a centralized lubricating system comprising an oil reservoir, a power driven reciprocating piston pump supplied therefrom, a branched conduit system substantially completely filled with lubricant connecting said pump with a plurality of bearings having different lubrication requirements, power operated control means coordinated with said pump to regulate the operation of the pump and measuring valve metering means in the branches of the conduit system to apportion the lubricant among the bearings according to their individual requirements, each of said measuring valve means including a fitting provided with a measuring chamber enclosing a reciprocating piston valve closely fitting within said chamber with a small clearance to permit slow leakage thereby under pressure, an outlet check valve and spring return means for said piston valve and said check valve; said reciprocating piston valve being held at one end of said chamber by said spring and said chamber being held full of oil by said check valve preventing flow out of said chamber during the periods between intermittent injections by said pump; said piston valve and said check valve being moved against said spring upon injection by the pump, whereby said piston valve will eject a measured quantity of oil past said check valve towards its bearing; and said spring means after operation of said pump serving to return said piston valve and said check valve, said piston valve returning by reason of leakage past it whereby after return of said piston valve and said check valve said chamber will again be filled by said leakage, said pump upon each discharge reciprocation of said piston, discharging a volume of lubricant into said system in excess of the total combined volume of said chamber and at a pressure substantially in excess of the strength of said springs, and means to relieve said system of said excess of lubricant.

37. In a central lubricating system having a periodically actuated pump and a conduit leading to a bearing, a measuring valve metering outlet for said system serving as an outlet end for said conduit comprising a body having an inlet port, a recessed cylindrical chamber of relatively large diameter, a measuring piston therein having metallic contact with the walls of said chamber, said recess serving to permit by-passing of said lubricant around said piston to permit filling of said cylindrical chamber and the inside face of said piston serving as a valve, another cylindrical chamber of slightly smaller diameter, the shoulder between said chambers serving as a valve seat for the inside face of said piston, an outlet port from said second cylindrical chamber, a recessed valve stem projecting from the inside face of said piston through said port, a coil spring encircling said stem and reacting at its ends against the inside face of the piston and the shoulder between the second chamber and the outlet port, an enlargement on the end of said stem serving to close said outlet port and an outlet chamber beyond said outlet port.

38. A central lubricating system for a mechanism comprising a plurality of widely distributed bearings, each bearing having an apportioning unit connected thereto, said apportioning units comprising measuring means and accumulating means, said accumulating means entrapping a body of air, which body of air is directly compressed by, and directly contacts with the lubricant passing into said accumulating means, means in said measuring means for forcing measured charges of lubricant to said accumulating means, a single pump for feeding all said bearings, and means for conducting lubricant from said pump to said apportioning units.

39. A central lubricating system for a mechanism comprising a plurality of widely distributed bearings, each bearing having means for measuring and accumulating, under yielding pressure, successive charges of lubricant and for subsequently delivering the measured charges of lubricant thereto comprising measuring means, accumulating means for receiving measured charges from said measuring means, said accumulating means entrapping a body of air, which body of air is directly compressed by, and directly contacts with the lubricant passing into said accumulating means, means for preventing return flow of lubricant from said accumulating means to said measuring means, a single pump for feeding all said bearings, and means for conducting lubricant from said pump to said measuring and accumulating means.

40. A central lubricating system for a mechanism comprising a plurality of widely distributed bearings, each bearing having means for measuring and accumulating successive charges of lubricant and for subsequently delivering the measured charges of lubricant thereto, said means comprising measuring means, accumulating means for receiving measured charges from said measuring means, said accumulating means entrapping a body of air, which body of air is directly compressed by, and directly contacts with the lubricant passing into said accumulating means, a single pump for feeding all said bearings, and means for conducting lubricant from said pump to said measuring and accumulating means.

41. A central lubricating system for a mechanism comprising a plurality of widely distributed bearings, each bearing having means for measuring and storing, under yielding pressure, successive charges of lubricant, said storing means entrapping a body of air, which body of air is directly compressed by, and directly contacts with the lubricant passing into said storing means, a single pump for feeding all said bearings, means for connecting said pump with said measuring and storing means, and means for preventing the maximum pressure exerted on said measuring means from being communicated to said storing means.

42. A central lubricating system comprising an element to receive lubricant, means for producing successive charges of lubricant, yielding means for receiving the charges of lubricant from said charge producing means and for supplying the lubricant to said element under pressure, said yielding means entrapping a body of air, which body of air is directly compressed by, and directly contacts with the lubricant passing into said yielding means, means to cut off the supply of lubricant to said yielding means upon a charge of predetermined quantity, and a pump for supplying lubricant under pressure to said charge producing means.

43. A central lubricating system comprising an element to receive lubricant, means at said element for successively measuring charges of lubricant, means for storing said successive charges of lubricant, said storing means entrapping a body of air, which body of air is directly compressed by, and directly contacts with the lubricant passing into said storing means, means for conducting the measured charges of lubricant to said element and a pump for delivering lubricant under pressure to said first named means.

44. A central lubricating system comprising a plurality of means adjacent a bearing to be lubricated, said means acting periodically to deliver measured charges of lubricant under pressure, check valved means receiving said lubricant, a resilient pneumatic storage chamber provided with a common lubricant inlet and outlet carrying a wick in constant communication with said check valved means, and a bearing always in free communication with said chamber and adapted to receive lubricant therefrom.

45. A control unit for lubricant supply systems comprising a housing having an inlet and an open outlet, a check valve in said inlet, said housing consisting in part of a cup adapted to contain air and located between said check valve and said outlet, a measuring means with an inlet and an outlet, said measuring means outlet being connected to said first mentioned inlet and reciprocatory valve means in said cup to regulate the volume of air to be retained therein.

46. In combination with a bearing to be lubricated, a conduit leading to said bearing, a check valve in said conduit, said conduit being continuously open from said check valve to said bearing, an air filled chamber with an inlet and outlet in open communication with said conduit between said check valve and said bearing, a measuring means with an inlet and an outlet, said measuring means outlet being connected to said first mentioned inlet and a check valve for regulating the amount of air maintained in said chamber.

47. A central lubricating system comprising means acting periodically to deliver charges of lubricant under pressure, check valved means receiving said lubricant, a resilient pneumatic storage chamber with a lubricant inlet and outlet communicating with and supplied with lubricant from said check valved means, said chamber being provided with an air vent having a reciprocatory valve control means, a measuring means with an inlet and an outlet, said measuring means outlet being connected to said first mentioned inlet and a bearing communicating with said chamber to receive lubricant therefrom.

48. A lubricating system comprising means acting periodically to deliver lubricant under pressure, check valved means receiving said lubricant, a resilient storage chamber with a lubricant inlet and outlet communicating with and supplied with lubricant from said check valved means, said chamber being provided with an air vent having a reciprocatory valve control means moved upwardly by the flow of lubricant into the chamber and downwardly by the outward flow of lubricant from the chamber, a measuring means with an inlet and an outlet, said measuring means outlet being connected to said first mentioned inlet and a bearing communicating with said chamber to receive lubricant therefrom.

JOSEPH BIJUR.